(12) United States Patent
Tuatini et al.

(10) Patent No.: US 8,775,448 B2
(45) Date of Patent: Jul. 8, 2014

(54) HIGH-THROUGHPUT MESSAGE GENERATION

(75) Inventors: Jeffrey Taihana Tuatini, Greenbrae, CA (US); Arun Ananthanarayanan Tharuvai, San Francisco, CA (US); Bradley Harold Sergeant, Portland, OR (US)

(73) Assignee: Responsys, Inc., San Bruno, CA (US)

( * ) Notice: Subject to any disclaimer, the term of this patent is extended or adjusted under 35 U.S.C. 154(b) by 14 days.

(21) Appl. No.: 13/455,069

(22) Filed: Apr. 24, 2012

(65) Prior Publication Data

US 2013/0282741 A1     Oct. 24, 2013

(51) Int. Cl.
    *G06F 17/30*         (2006.01)

(52) U.S. Cl.
    USPC .......................................... 707/756; 707/802

(58) Field of Classification Search
    USPC ................................... 709/207; 707/802, 756
    See application file for complete search history.

(56) References Cited

U.S. PATENT DOCUMENTS

| | | | | |
|---|---|---|---|---|
| 5,870,765 | A | * | 2/1999 | Bauer et al. ................... 707/610 |
| 6,665,677 | B1 | * | 12/2003 | Wotring et al. ....................... 1/1 |
| 2002/0099781 | A1 | * | 7/2002 | Scheussler et al. ........... 709/206 |
| 2008/0278740 | A1 | * | 11/2008 | Bird et al. .................... 358/1.15 |
| 2008/0320023 | A1 | * | 12/2008 | Fong ............................. 707/101 |

* cited by examiner

*Primary Examiner* — Cam Truong
(74) *Attorney, Agent, or Firm* — Vista IP Law Group, LLP

(57) ABSTRACT

Personalized messages are generated from a message template with high throughput by transforming data sources of the message template to key-value data structures that are stored in-memory and performing data look-ups using the in-memory key-value data structures.

13 Claims, 6 Drawing Sheets

HIGH-THROUGHPUT MESSAGE GENERATION

BACKGROUND

1. Field of the Invention

Embodiments of the present invention relate to the field of marketing and, in particular, to a system and method for generating messages that are part of a marketing campaign with high throughput.

2. Description of the Related Art

Marketers are continually seeking better ways to create, execute, and automate campaigns with the goal of growing revenue and strengthening customer loyalty. One aspect of such campaigns is personalized messages, which may be a web page, an advertisement, an e-mail communication, a text message, or a mobile message. FIG. 1 illustrates a conventional process for generating personalized messages. During design phase 101, the marketer designs a template 110 for a personalized message that includes stock message sections 112 and personalization sections 114. Stock message sections 112 contain standardized messages that are the same for all recipients of the personalized message. Personalization sections 114 include commands defined by the marketer that invoke queries to a relational database system (RDBS) 120, which stores the marketer's data for generating the personalized messages. During execution phase 102, the marketer iterates through each of its customer records in RDBS 120 and performs the steps of: querying RDBS 120 for data to populate personalization sections 114 of template 110, generating the personalized message with the data returned from RDBS 120, and sending out the personalized message to the customer.

When customer records in a marketer's RDBS number in the hundreds or thousands, the method described above may be executed in a reasonable amount of time. However, the method described above does not scale very well such as when the number of customer records increases to millions or even billions. In such cases, where a high throughput on the order of tens of thousands of messages per second is desirable, the method described above has too much latency, and the latency per message generated is highly variable, because it requires random reads of data associated with database look-ups.

SUMMARY

One or more embodiments of the invention provide a technique to generate personalized messages with high throughput. In this technique, the data used in personalizing the messages are stored in a relational database but relational database look-ups are not performed during message generation so that high throughput can be achieved.

A method according to one embodiment of the invention is carried out in a computer system in conjunction with a marketing campaign that includes a design phase, a publishing phase, and an execution phase.

The method, during the publishing phase, includes the steps of parsing a message template defined during the design phase for commands to be executed to look up data from tables of a relational database, identifying for each of the commands, a corresponding table and a look-up key, and transforming each table into a key-value data structure. Each key-value data structure stores a primary key of the corresponding table as a key of the data structure, and one or more other data fields of the corresponding table in a value field of the data structure. One or more of the key-value data structures may also include an index field in which a look-up key that is different from the primary key is stored. The method, during the execution phase, includes the step of generating personalized messages using the message template and the key-value data structures transformed from the tables.

Embodiments of the present invention further include a non-transitory computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
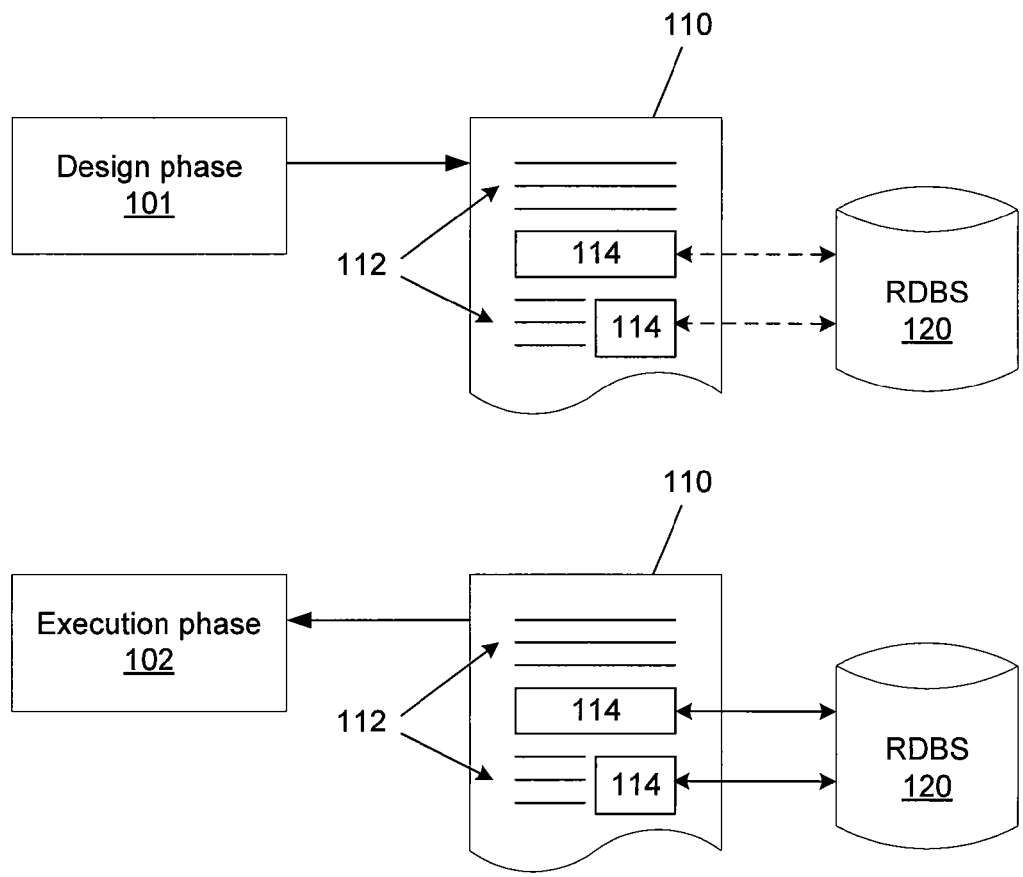
FIG. 1 illustrates a conventional process for generating personalized messages.
Figure 2:
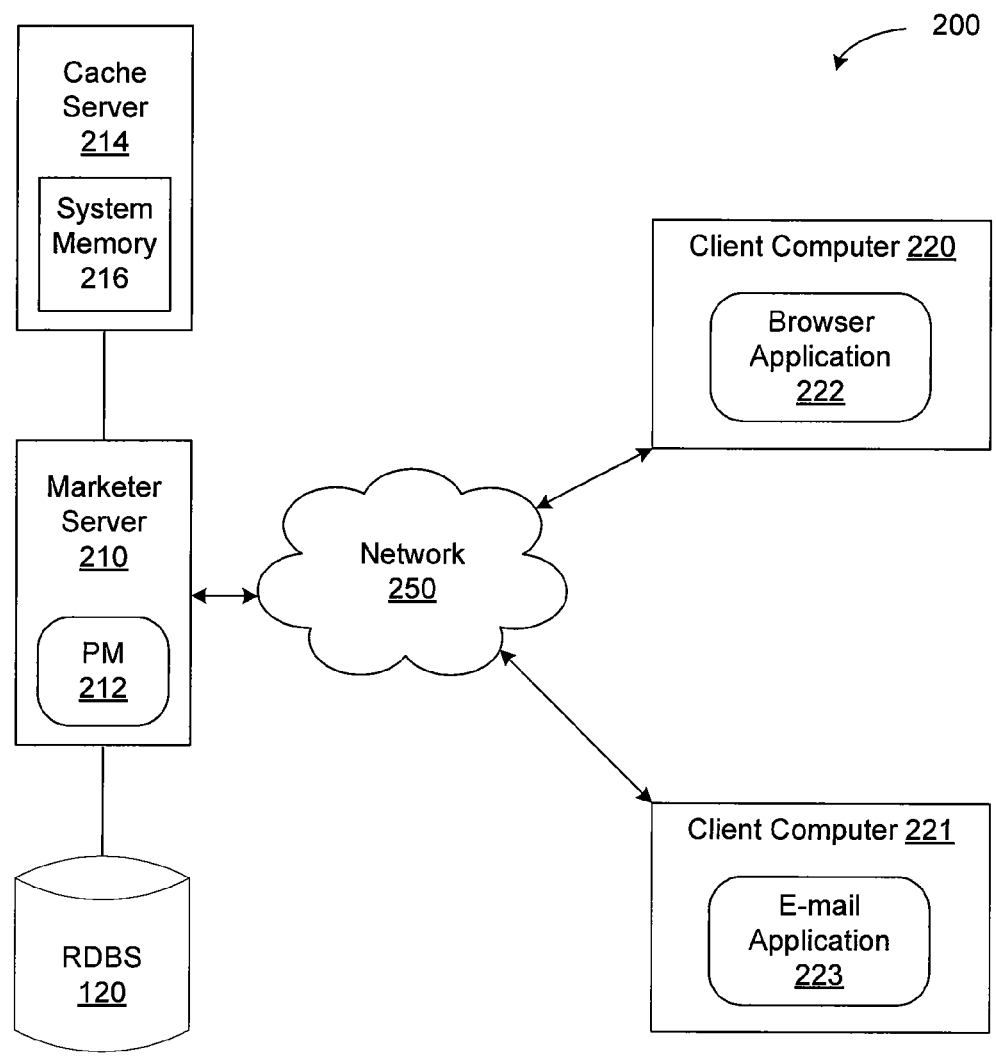
FIG. 2 is a schematic block diagram of a network computer system in which one or more embodiments of the invention may be practiced.

FIG. 2 is a schematic block diagram of a network computer system in which one or more embodiments of the invention may be practiced. As shown, networked computing system 200 includes a marketer server 210 and a plurality of client computers 220 (only two of which are shown for clarity), each connected to a communications network 250 (e.g., the Internet). Each client computer includes conventional components of a computing device, e.g., a processor, system memory, a hard disk drive, input devices such as a mouse and a keyboard, and/or output devices, such as a monitor. The client computer may be any computing device such as a desktop computer, a portable computer, a tablet computer, or even a smartphone. Server 210 includes a processor and system memory, and is configured to manage various marketing campaigns. In the embodiment illustrated herein, the marketing campaign managed by server 210 is a personalized message campaign. A personalized message software module (PM 212) is installed in server 210 to manage this campaign. RDBS 120 stores records that contain data that are used in generating the personalized messages. Personalized messages may be generated in various forms including a web page, an advertisement, an e-mail communication, a text message, or a mobile message. Personalized messages generated in the form of a web page or an advertisement may be viewed through a browser application 222 running in client computer 220. Personalized messages generated in the form of an e-mail communication may be viewed through an e-mail application 223 running in client computer 221. Personalized messages generated in the form of a text message or a mobile message may be viewed through an appropriate application running in a mobile computing device.

In one embodiment, a cache server 214 is provided to support server 210. Cache server 214 caches content accessed by server 210 in system memory 216, which is typically implemented as dynamic random access memory (DRAM). For example, as will be further described below, cache server 214 stores in system memory 216 key-value data structures that are generated from tables of RDBS 120 and accessed by server 210 during execution of the personalized message campaign. In other embodiments, system memory of server 210 may be configured to be large enough to store the key-value data structures locally therein.

Figure 3:
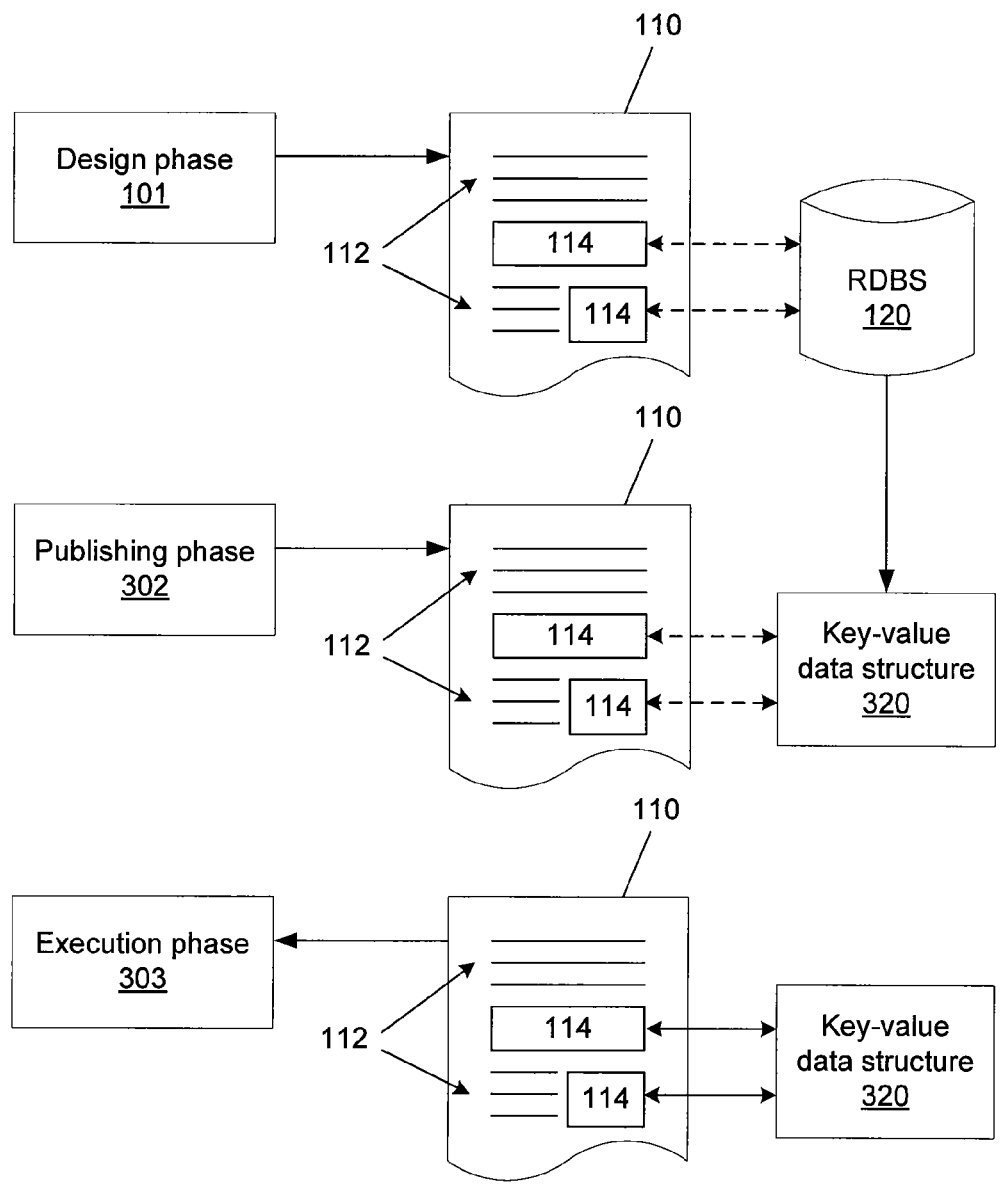
FIG. 3 illustrates a process for generating personalized messages, according to an embodiment of the invention.

FIG. 3 illustrates a process for generating personalized messages, according to an embodiment of the invention. The process shown in FIG. 3 has three distinct phases, design phase 101, publishing phase 302, and execution phase 303. Design phase 101 is carried out as in the conventional process. As described above, during design phase 101, the marketer designs template 110 for a personalized message that includes stock message sections 112 and personalization sections 114. Stock message sections 112 contain standardized messages that are the same for all recipients of the personalized message. Personalization sections 114 include commands defined by the marketer that invoke queries to RDBS 120, which stores the marketer's data for generating the personalized messages.

After template 110 has been designed, the process moves onto a publishing phase 302. During this phase, template 110 is parsed in the manner described below in conjunction with FIG. 4 and tables of RDBS 120 that provide the data for customizing personalization sections 114 are transformed to key-value data structures 320 that are stored in system memory 216 of cache server 214 to enable low latency look-ups of data. As shown in FIGS. 5A and 5B, tables of RDBS 120 may be transformed to key-value data structures each having a key field, a value field, and one or more index fields.

One of the tables of RDBS 120 that is transformed into a key-value data structure is a profile table that contains an entry per customer and data fields that define attributes of the customer, such as customer ID, name, date of birth, address, phone number, and e-mail address. During execution phase 303, a personalized message is generated for each entry in this key-value data structure. Personalization sections 114 of the personalized message may be populated with data from this key-value data structure and/or other key-value data structures that are transformed from tables of RDBS 120.

Figure 4:
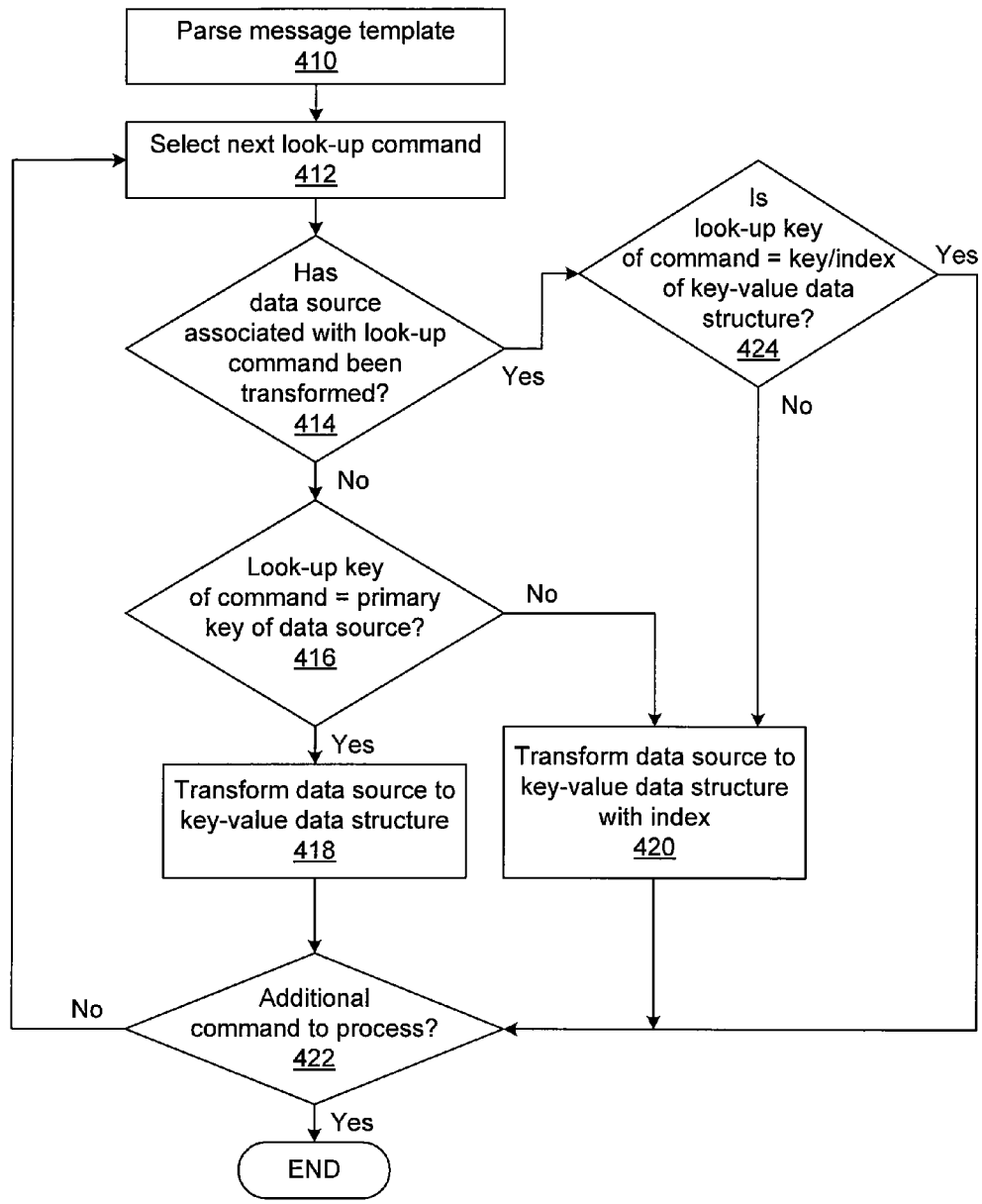
FIG. 4 is a flow diagram that illustrates the method of transforming tables of a relational database to key-value data structures based on look-up commands included in a message template.
Figure 5A:
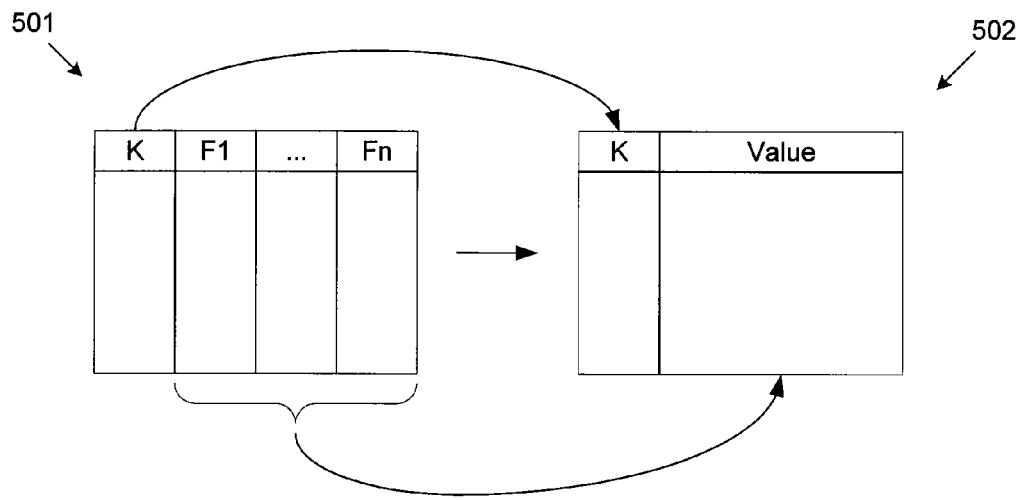
FIG. 5A is a conceptual diagram that illustrates the transformation of a table of a relational database to a key-value data structure.
Figure 5B:
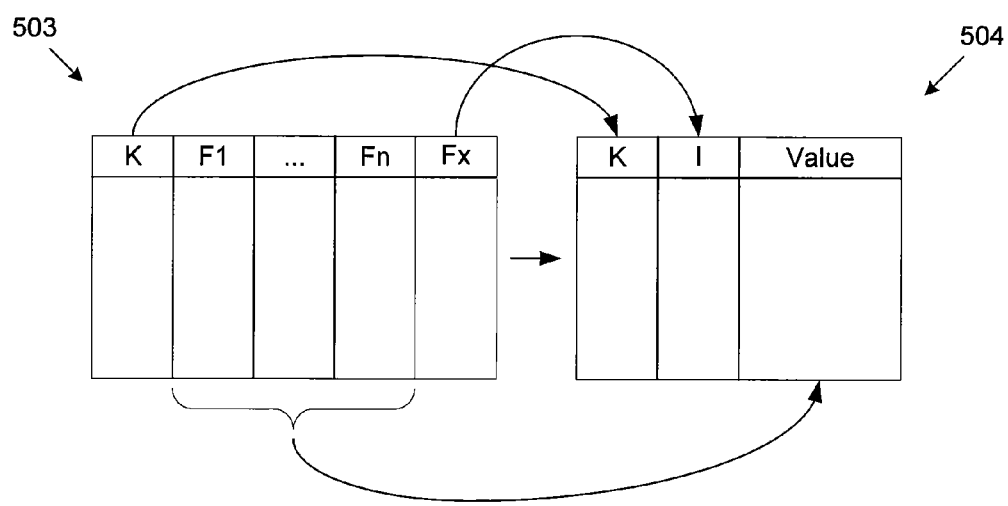
FIG. 5B is a conceptual diagram that illustrates the transformation of a table of a relational database to a key-value data structure with an index field.

FIG. 4 is a flow diagram that illustrates the method, according to an embodiment of the invention, of transforming tables of a relational database to key-value data structures based on look-up commands included in a message template. In the embodiment illustrated herein, this method is carried out by PM 212 of server 210 during execution of a marketing campaign for sending out personalized messages.

At step 410, PM 212 parses a message template that has been designated for the marketing campaign, e.g., template 110, to find commands by which data from tables of a relational database system (e.g., RDBS 120) are to be looked up. At step 412, PM 212 selects one such look-up command and determines, at step 414, whether a data source associated with this look-up command (e.g., one of the tables of RDBS 120) has already been transformed to a key-value data structure. If not, step 416 is executed next, at which the syntax of the look-up command is analyzed to determine the look-up key associated with this look-up command and whether or not this look-up key is the same as the primary key of the data source.

In one example, the command for searching through a profile table that records profile data of all customers of the marketing campaign may be expressed as $lookup(FIELD)$, where the look-up key is assumed to be the same as the primary key of the profile table and FIELD represents the variable for the field name from which data is to be retrieved and returned. Accordingly, if the look-up command is expressed as $lookup(FIELD)$, step 418 is executed, at which the profile table is transformed to a key-value data structure.

FIG. 5A is a conceptual diagram that illustrates the transformation of a table 501 of a relational database to a key-value data structure 502 stored in memory (e.g., system memory 216 of cache server 214). Table 501 includes a primary key K (e.g., customer ID) and a plurality of data fields F1-Fn (e.g., name, phone number, e-mail address, etc.). When table 501 is transformed to key-value data structure 502, the total number of entries remains the same and the primary key is retained as the key of key-value data structure 502. However, for each entry, the data in data fields F1-Fn are encoded as a single value and stored in the value field of key-value data structure 502. In one embodiment, binary encoding is carried out to encode the data in data fields F1-Fn into a single value. In addition, the data may or may not be compressed during the binary encoding, and each binary encoded field is preceded by a 'field-type' byte identifying the field type such as UTF string, signed long, etc. The field-type byte identifies for non-string types, the number of following bytes that store the encoded field. For string types, the UTF representation of the string includes a size in the header that identifies the size of the string field.

In another example, the look-up key employed in the command for searching through a table may be different from the primary key of the table. The command $lookuptable (purchases, FIELD1, CUST_ID, FIELD2)$ provides one such example, where purchases identifies the table, FIELD1 represents the variable for the field name (different from the primary key of the purchases table) that is to be searched for an entry that matches CUST_ID, and FIELD2 represents the variable for the field name from which data is to be retrieved and returned. The command $lookuptable (purchases, PURCHASER_ID, CUST_ID, PURCHASE_DT)$ will search the PURCHASER_ID field of the purchases table for an entry that matches CUST_ID, and return a value from the PURCHASE_DT field of the associated record. Accordingly, if the look-up command is expressed as $lookuptable (purchases, PURCHASER_ID, CUST_ID, PURCHASE_DT)$, PURCHASER_ID becomes the look-up key, and step 420 is executed, at which the profile table is transformed to a key-value data structure with the PURCHASER_ID stored as an index field.

It should be recognized that the command for searching through a table may be nested such as in: $lookuptable (purchases, FIELD1, lookup(EMAIL), FIELD2)$, where purchases identifies the table, FIELD1 represents the variable for the field name that is to be searched for an entry that matches the value that is returned as a result of executing lookup (EMAIL), and FIELD2 represents the variable for the field name from which data is to be retrieved and returned.

FIG. 5B is a conceptual diagram that illustrates the transformation of a table 503 of a relational database to a key-value data structure 504 with an index field. Table 503 includes a primary key K (e.g., transaction ID) and a plurality of data fields F1-Fn, Fx (e.g., customer ID, purchase description, purchase amount, purchase date, etc.). When table 503 is transformed to key-value data structure 504, the total number of entries remains the same and the primary key is retained as the key of key-value data structure 504. However, for each entry, the data in data fields F1-Fn are encoded as a single value (employing binary encoding, in one embodiment, as described above) and stored in the value field of key-value data structure 504, and an additional index field is created for the data field that is used as a secondary index when executing a look-up command. In the example given above, when executing the command, $lookuptable (purchases, PURCHASER_ID, CUST_ID, PURCHASE_DT)$, the PURCHASER_ID field will be used as the secondary index.

At step 422, PM 212 determines if there are any additional commands to process. If not, the process ends. If there are any additional commands, step 412 is executed as described above to select another look-up command.

Returning to step 414, if the data source associated with the look-up command selected at step 412 has already been transformed to a key-value data structure by the execution of step 418 or step 420, the syntax of the look-up command is analyzed to determine the look-up key associated with this look-up command and whether or not this look-up key is the key or index of the key-value data structure. If it is, the process continues onto step 422. If it is not, step 420 is carried out to regenerate the key-value data structure from the data source so that the look-up key is included as an index field.

Figure 6:
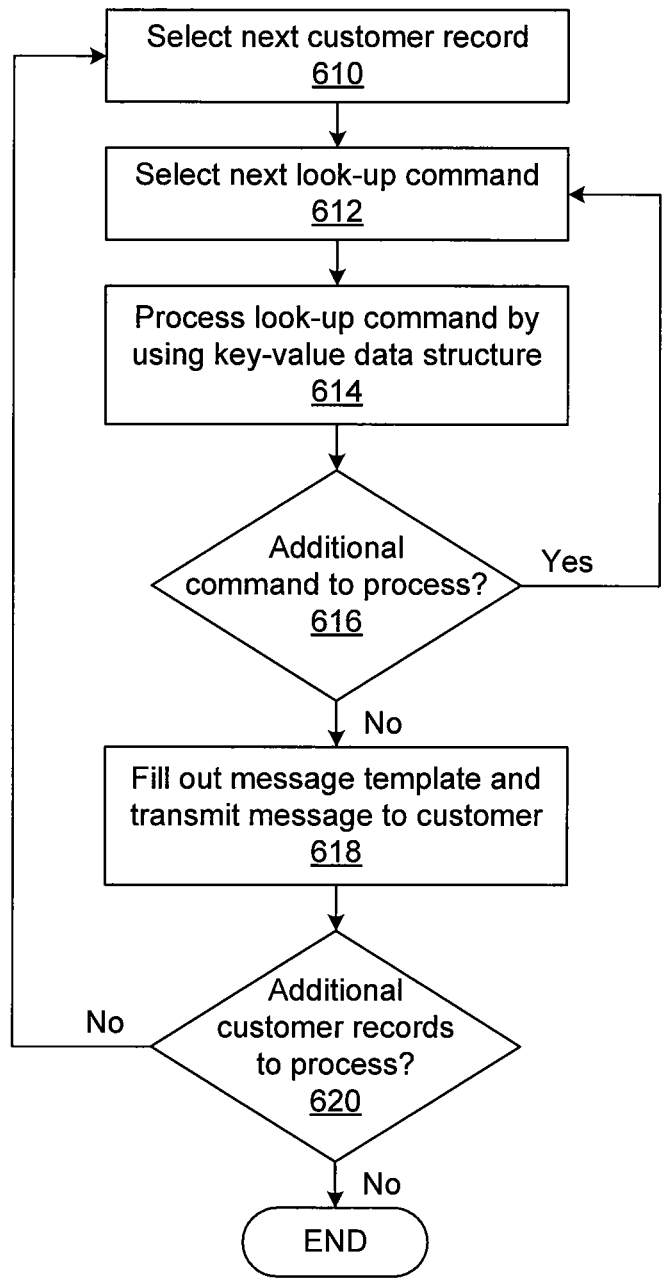
FIG. 6 is a flow diagram that illustrates a personalized message campaign that is carried out according to an embodiment of the invention.

FIG. 6 is a flow diagram that illustrates a personalized message campaign that is carried out according to an embodiment of the invention. In the embodiment illustrated herein, this method is carried out by PM 212 of server 210 during the execution phase of a marketing campaign after tables of a relational database system have been transformed to corresponding key-value data structures in accordance with look-up commands contained in a message template designed for the personalized message campaign.

At step 610, the next customer record to be processed is retrieved from a key-value data structure that contains customer records. Then, the next look-up command in the message template is selected at step 612 and processed using the associated key-value data structure at step 614. If there are additional look-up commands to be processed, as determined at step 616, steps 612, 614, and 616 are repeated. On the other hand, if there are no more look-up commands to be processed, step 618 is executed, where the message template is filled out with the data returned from the look-ups and transmitted to the customer. If there are additional customer records to process, as determined at step 620, the process returns to step 610. If not, the process ends.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method carried out in a computer system to generate personalized messages using data stored in a relational database, comprising the steps of:
    parsing a message template for commands to be executed to look up data from a plurality of tables of the relational database, each table of the tables having a primary key;
    identifying for each command of the commands, a corresponding table from the plurality of tables and a look-up key, wherein the commands include a plurality of commands to be executed to look up data from a first table, the plurality of commands employing a plurality of unique look-up keys that are different from a primary key of the first table;
    transforming each one of the plurality of tables identified as corresponding to one of the commands into a respective key-value data structure if the respective key-value data structure has not yet been created, wherein the respective key-value data structure has the same number of entries as the one of the plurality of tables and includes a key field, a value field, and an index field, wherein the key field stores the primary key of the one of the plurality of tables, wherein the value field stores a plurality of data fields of the one of the plurality of tables encoded as a single value, wherein the index field stores the look-up key corresponding to the one of the commands, and wherein the key-value data structure that is transformed from the first table includes a plurality of index fields in which the plurality of unique look-up keys are stored; and
    generating personalized messages using the message template and the key-value data structures transformed from the tables.

2. The method of claim 1, wherein the personalized messages are generated without accessing the tables from which the key-value data structures have been transformed.

3. The method of claim 1, wherein the number of tables identified from the message template is the same as the number of key-value data structures transformed from the tables.

4. The method of claim 1, wherein the number of commands is greater than the number of tables.

5. The method of claim 1, wherein the tables of the relational database are stored primarily in persistent memory and the key-value data structures transformed therefrom are stored in volatile memory.

6. A method carried out in a computer system in conjunction with a marketing campaign that includes a design phase, a publishing phase, and an execution phase, the method comprising the steps of:
    during the publishing phase, parsing a message template defined during the design phase for commands to be executed to look up data from a plurality of tables of a relational database, each table of the tables having a primary key;

identifying for each command of the commands, a corresponding table from the plurality of tables and a look-up key, wherein the commands include a plurality of commands to be executed to look up data from a first table, the plurality of commands employing a plurality of unique look-up keys that are different from a primary key of the first table;

transforming each one of the plurality of tables identified as corresponding to one of the commands into a respective key-value data structure if the respective key-value data structure has not yet been created, wherein the respective key-value data structure has the same number of entries as the one of the plurality of tables and includes a key field, a value field, and an index field, wherein the key field stores the primary key of the one of the plurality of tables, wherein the value field stores a plurality of data fields of the one of the plurality of tables encoded as a single value, wherein the index field stores the look-up key corresponding to the one of the commands, and wherein the key-value data structure that is transformed from the first table includes a plurality of index fields in which the plurality of unique look-up keys are stored; and during the execution phase, generating personalized messages using the message template and the key-value data structures transformed from the tables.

7. The method of claim 6, wherein the personalized messages are generated without accessing the tables from which the key-value data structures have been transformed.

8. The method of claim 6, wherein the number of tables identified from the message template is the same as the number of key-value data structures transformed from the tables.

9. The method of claim 6, wherein the number of commands is greater than the number of tables.

10. The method of claim 6, wherein the tables of the relational database are stored primarily in persistent memory and the key-value data structures transformed therefrom are stored in volatile memory.

11. A non-transitory computer readable storage medium comprising instructions to be carried out in a computer system to cause the computer system to perform a method of generating personalized messages using data stored in a relational database, said method comprising the steps of:

parsing a message template for commands to be executed to look up data from a plurality of tables of the relational database, each table of the tables having a primary key;

identifying for each command of the commands, a corresponding table from the plurality of tables and a look-up key, wherein the commands include a plurality of commands to be executed to look up data from a first table, the plurality of commands employing a plurality of unique look-up keys that are different from a primary key of the first table;

transforming each one of the plurality of tables identified as corresponding to one of the commands into a respective key-value data structure if the respective key-value data structure has not yet been created, wherein the respective key-value data structure has the same number of entries as the one of the plurality of tables and includes a key field, a value field, and an index field, wherein the key field stores the primary key of the one of the plurality of tables, wherein the value field stores a plurality of data fields of the one of the plurality of tables encoded as a single value, wherein the index field stores the look-up key corresponding to the one of the commands, and wherein the key-value data structure that is transformed from the first table includes a plurality of index fields in which the plurality of unique look-up keys are stored; and generating personalized messages using the message template and the key-value data structures transformed from the tables.

12. The non-transitory computer readable storage medium of claim 11, wherein the personalized messages are generated without accessing the tables from which the key-value data structures have been transformed.

13. The non-transitory computer readable storage medium of claim 11, wherein the number of tables identified in the message template is the same as the number of key-value data structures transformed from the tables.

* * * * *